(12) United States Patent
He et al.

(10) Patent No.: US 11,853,318 B1
(45) Date of Patent: Dec. 26, 2023

(54) DATABASE WITH TOMBSTONE ACCESS

(71) Applicant: Amazon Technologies, Inc., Seattle, WA (US)

(72) Inventors: Hao He, Seattle, WA (US); Akhilesh Mritunjai, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/909,582

(22) Filed: Jun. 23, 2020

(51) Int. Cl.
*G06F 16/27* (2019.01)
*G06F 16/23* (2019.01)

(52) U.S. Cl.
CPC .......... *G06F 16/27* (2019.01); *G06F 16/2365* (2019.01)

(58) Field of Classification Search
CPC .............................. G06F 16/27; G06F 16/2365
USPC ......................................................... 707/634
See application file for complete search history.

(56) References Cited

U.S. PATENT DOCUMENTS 6,256,634 B1\* 7/2001 Moshaiov ........... G06F 16/2308
2010/0274769 A1\* 10/2010 Hazlewood ............. G06F 16/10
707/E17.005

\* cited by examiner

*Primary Examiner* — Michael Pham
(74) *Attorney, Agent, or Firm* — Davis Wright Tremaine LLP (57) ABSTRACT

A data store maintains a collection of data using a log-based storage structure. In response to a request to delete an item from the collection, the database management system adds a tombstone entry to the log-based storage structure, with additional metadata associated with the tombstone. Access to the tombstone metadata is provided to a client of the data store. The tombstone is deleted from the log-based storage structure after expiry of a time-to-live period.

20 Claims, 8 Drawing Sheets

DATABASE WITH TOMBSTONE ACCESS

BACKGROUND

Database management systems are called upon to provide fast, reliable, and consistent access to data. To provide such access at scale, distributed databases have been developed. A distributed database may comprise numerous computing devices distributed across various data centers and geographical locations. A collection of data may be replicated across these devices, so that each participant in this replication process can provide access to the collection. However, replicating operations to delete items from the collection can present challenging technical problems.

BRIEF DESCRIPTION OF THE DRAWINGS

Various techniques will be described with reference to the drawings, in which.

DETAILED DESCRIPTION

Described herein are systems and techniques related to the operation of databases, including standalone and distributed database management systems. In one example, a distributed database management system comprises a first replication partner comprising a front-end client and a storage node. These are paired with a second replication partner, also comprising a front-end client and a storage node, at another location. The front-end client at the first replication partner may receive a request to delete an item of data from a collection of items. The front-end client responds to the request by instructing the storage node to delete the item. The storage node, which utilizes a log-based storage structure to maintain the collection of items, appends a tombstone entry to its log to indicate that the item has been deleted. The deletion may then be replicated to the second replication partner. However, there are cases in which it would be advantageous if the second replication partner's front-end client could access, or even change, detailed information about the deletion status of the item within its own storage node. For example, it might be the case that the second replication partner has deleted the same item independently of the first replication partner. When the delete is replicated from the first replication partner to the second, the second replication partner's front-end client can reconcile the two delete operations using the system's ability to access and change tombstone information stored within the log-based storage structure.

In another example, a client of a database uses tombstone access capabilities to obtain or correct information related to a deleted item. For example, an application running on a client device might have application logic that is invoked when an item is deleted. This logic may depend on information indicating when the item was deleted, who deleted the item, and so forth. By allowing the application to access tombstone information, the application does not need to include logic to separately maintain this information.

In another example, tombstone records are deleted by a storage node after the expiry of a time-to-live ("TTL") period. This helps to preserve storage space that might otherwise be consumed by tombstone entries. Regarding the replication partners described above, the TTL period for tombstone entries may be set for a time period that is at least slightly longer than the maximum amount of time expected for replication to occur. For example, if the deletion of an item is expected to take no more than 24 hours to replicate to all of the replication partners in a system, the TTL period might be set at 36 hours.

In another example, tombstone entries are preserved, prior to TTL expiration, when merging substructures of a log-based storage structure. The log-based storage structure can be described as having multiple levels of substructures. Entries to the log are initially added to a higher-level substructure, and subsequently merged into lower-level substructures during a process sometimes referred to as compaction. If a tombstone entry in a higher-level substructure has expired, it is not merged, and may be deleted.

In another example, tombstone entries are maintained in separate substructures. A log-based storage structure may be used to store log entries which describe a collection of data. For example, an entry in a log may represent the addition of a new item to the collection of data. A subsequent entry may represent a change to the item. Finally, a tombstone entry may be added to the log to indicate that the item has been deleted. To facilitate efficient retrieval of tombstone information, the tombstone entries may be kept in substructures that are separate from other types of entries. This may allow for tombstone information to be accessed more quickly than if the tombstone entries were intermingled with other entry types, and may also allow for more efficient deletion of tombstone entries once those entries have expired.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including that embodiments disclosed herein enable storage node clients or third-party applications to improve processing of deleted records in a wide variety of scenarios, including but not limited to scenarios involving replication.

Figure 1:
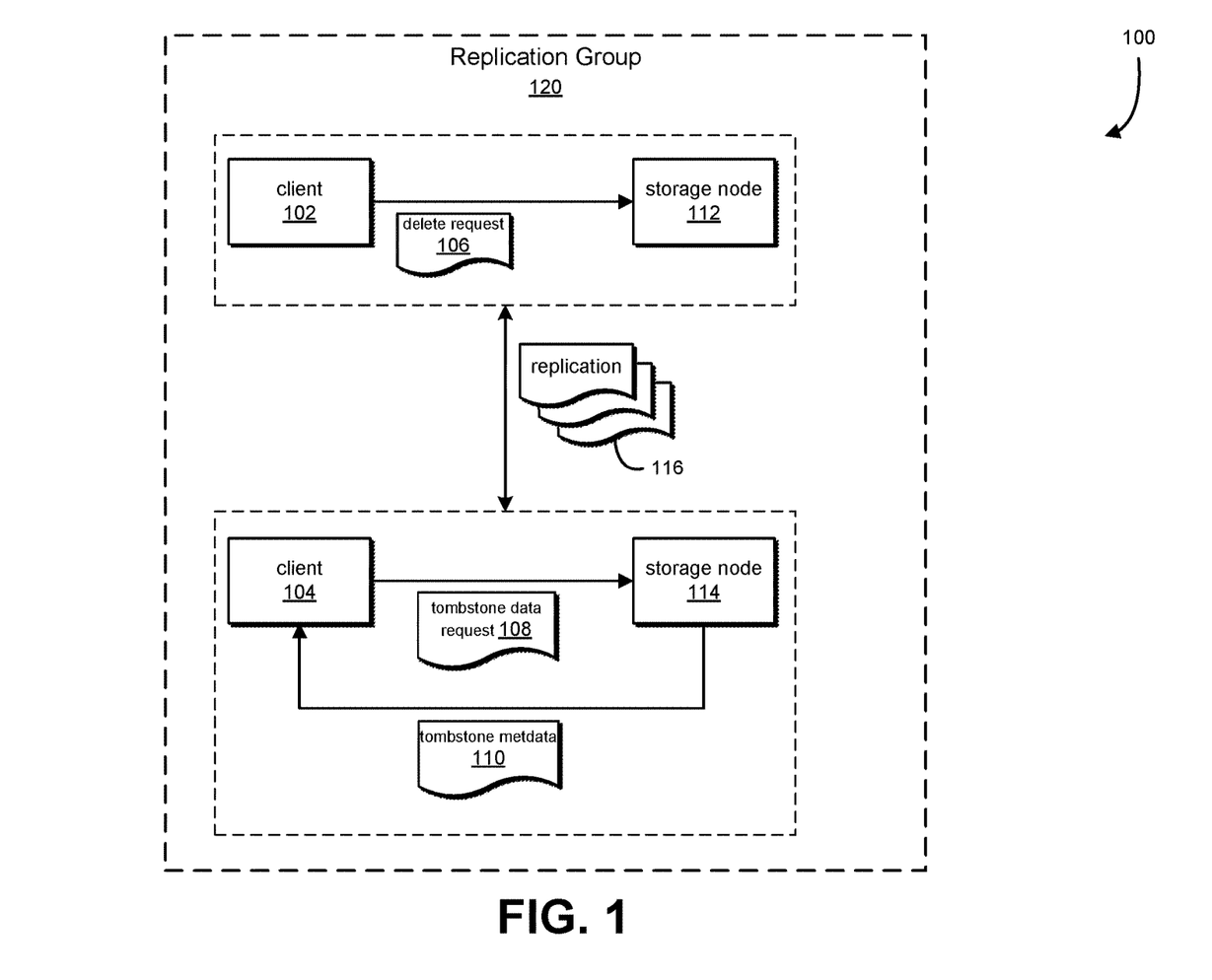
FIG. 1 illustrates an example of a distributed database comprising storage nodes with tombstone access capability, in accordance with at least one embodiment.

FIG. 1 illustrates an example of a distributed database comprising storage nodes with tombstone access capability, in accordance with at least one embodiment. In the example of FIG. 1, a distributed database system 100 maintains a database of data. In at least one embodiment, the database data comprises collections of data items, to which data may be added, updated, or deleted. The collection of data is replicated among storage nodes 112, 114 of the distributed database system. One aspect of the replication involves the deletion of data items, and the handling of deletion using a tombstone access capability.

In the example distributed database system 100 of FIG. 1, a replication group 120 comprises clients 102, 104 and storage nodes 112, 114. In at least one embodiment, clients 102, 104 are front-ends to storage nodes 112, 114 and receive requests, from various third-party applications, to store and retrieve data.

In at least one embodiment, a replication process 116 replicates data between the storage nodes 112, 114, so that changes made to items stored on a collection of data maintained by a first storage node 112 are made to corresponding items maintained on a second storage node 114.

In at least one embodiment, delete operations performed on one storage node are applied to other storage nodes. For example, when an item is deleted from a collection of data maintained by a first storage node 112, the replication process 116 causes the corresponding record to also be deleted from the second storage node 114. Note, however, that a storage node 114 might receive an independent request to delete the same item before being informed of the deletion. For example, the client 104 might instruct storage node 114 to delete the same item, prior to being informed, by the replication process 116, of the earlier deletion of the record. In at least one embodiment, the client 104 uses tombstone access capability to determine whether an item has already been deleted, and to retroactively update tombstone information to indicate a correct time of deletion.

In at least one embodiment, the example system 100 comprises a storage node, such as any of the depicted storage nodes 112, 114, that includes at least one processor and a memory. The memory comprises instructions that, in response to execution by the at least one processor, cause the storage node to store database data in a log-based storage structure. The database data includes a collection of items. Each item in the collection is stored, in the log-based storage structure, as one or more entries, which may include log entries.

In at least one embodiment, the distributed database system 100 responds to a request 106 to delete, from the database, data associated with a first entry in the log-based storage structure. The system 100 responds to the request by storing another entry in the log-based storage structure, where the second entry comprises information indicating that the second entry is a tombstone of the first entry. As noted, a given item in the database may be represented by one or more entries in the log-based storage structure. The second entry, which may be referred to as a tombstone of the item, may therefore refer to a number of entries in the log-based storage structure, and each of these entries may refer to the same item in the collection of data.

In at least one embodiment, the second entry comprises metadata associated with the tombstone. The metadata may, for example, include a timestamp or serial number. The metadata, in at least one embodiment, includes a time-to-live value for the tombstone. The metadata can also include data provided by the client for storing with the tombstone.

In at least one embodiment, a storage node, such as any of the depicted storage nodes 112, 114, receives a tombstone data request 108 sent from a client, such as any of the depicted clients 102, 104. In at least one embodiment, the tombstone data request 108 comprises an identifier of the item to which the tombstone refers. The tombstone data request can also, in some embodiments, be formulated as a query for the tombstones of a range of items meeting the criteria indicated by the query.

In at least one embodiment, the storage node responds to the tombstone data request 108 by providing tombstone metadata 110 to the requesting client. For example, in response to the request 108 to access a tombstone, the storage node may respond by sending back, to the client, metadata that is associated with the tombstone, such as a timestamp or serial number. In at least one embodiment, the response indicates whether or not an item has been deleted, and an indication of when the deletion occurred. In at least one embodiment, a storage node, such as any of the depicted storage nodes 112, 114 searches a log-based storage structure to identify an entry, or entries, that include information indicating that they are tombstones of the entry or entries that correspond to an item.

In at least one embodiment, a client, such as one of the depicted clients 102, 104, sends a request to, to a storage node, to update tombstone metadata. In at least one embodiment, a storage node, such as one of the depicted storage nodes 112, 114, responds to the request to update metadata associated with the tombstone by adding, to a log-based storage structure, information describing the updated metadata. As with data for items, tombstone data may be stored incrementally, so that each entry associated with a particular tombstone adds to, subtracts from, or modifies that tombstone's metadata.

The replication process 116 may cause tombstones and tombstone metadata to be replicated between storage nodes 112, 114 in the replication group 120. In at least one embodiment, the ability of a client, such as any of the depicted clients 102, 104, to access tombstone metadata facilitates maintenance of consistency between the different versions of the collection of data, as maintained by each of the storage nodes 112, 114 in the replication group 120. For example, it may take some time for replication of a delete request 106 processed by a first storage node 112 to be replicated to a second storage node 114. During this period, the second client 104 might process another request, independent of the first request 106, to delete the same item. A tombstone would be added, at that time, to the corresponding storage node 114. When the other tombstone is subsequently replicated from the other storage node 112, the client 104 can reconcile the two tombstones, e.g. by updating the tombstone metadata to indicate the earlier deletion.

In at least one embodiment, a storage node, such as any of the depicted storage nodes 112, 114, compacts its log-based storage structure. In at least one embodiment, compaction of a log-based storage structure comprises combining in-memory or on-disk logs. In at least one embodiment, the entries in the logs are sorted and merged.

In at least one embodiment, compaction of a log-bases storage structure comprises deleting a tombstone entry subsequent to the expiration of a time-to-live ("TTL") period associated with the tombstone entry. Entries associated with an item may be deleted if the corresponding item has been deleted. However, the item's tombstone entry not deleted, in at least one embodiment, until after the expiration of a TTL period.

In at least one embodiment, tombstone entries are separated from other entries during compaction, and stored in separate records or files. For example, a storage node may periodically compact a log-based storage structure. When examining entries in the structure, the storage node may determine that an entry is a tombstone, e.g., based on a flag or other information in the tombstone that indicates that the entry is a tombstone. The item and corresponding entries to which the tombstone belongs can be determined by an item key associated with the tombstone entry. The storage node may then store the tombstone entry with other tombstones in a file separate from non-tombstone entries. This approach, in some embodiments, may increase efficiency when attempting to locate and retrieve tombstone metadata 110.

Figure 2:
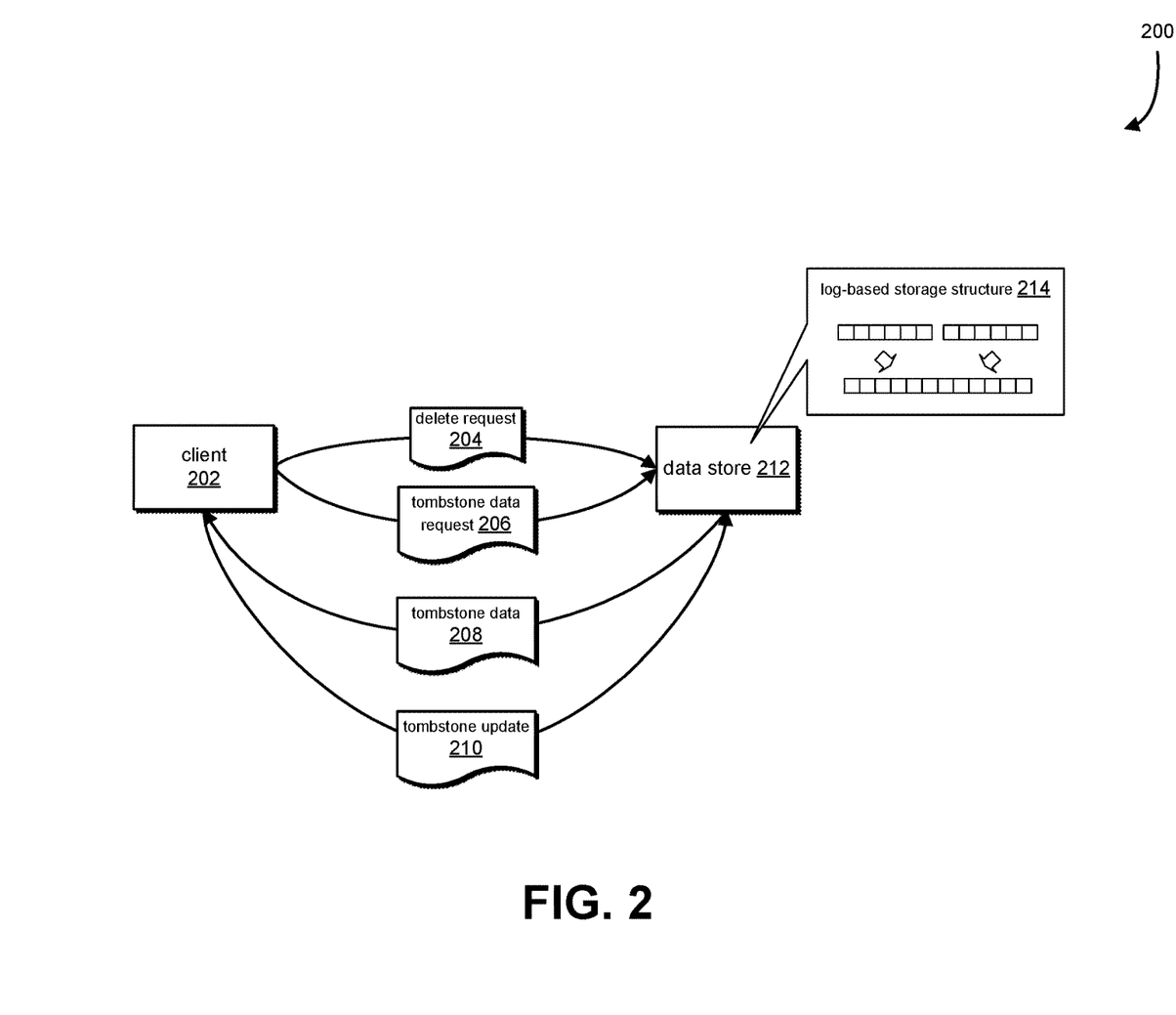
FIG. 2 illustrates an example of accessing tombstone data in a data store, in accordance with at least one embodiment.

FIG. 2 illustrates an example of accessing tombstone data in a data store, in accordance with at least one embodiment. In the example 200 of FIG. 2, a client 202 communicates with a data store 212 to request that the data store 212 perform various operations, such as adding, deleting, or modifying items stored within a collection of data, retrieving tombstone metadata, or modifying tombstone metadata.

In at least one embodiment, the client 202 is a front-end of a data store 212 in a distributed database. In at least one other embodiment, the client 202 is a computing device operated by a user of a database system comprising a data store 212.

A data store 212 comprises a computing device with at least one processor and a memory. The memory may be configured, by a non-transitory medium having stored thereon executable instructions that may be executed by the processor(s), and that, as a result of being executed by the processor(s), cause the computing device to perform one or more of operations described in relation to FIG. 2, such as processing requests to store or delete items from a collection of data, processing requests to access tombstone data, or processing requests to update tombstone data. The data store 212, in at least one embodiment, comprises one or more storage nodes, such as the storage nodes 112, 114 depicted in FIG. 1.

In at least one embodiment, the data store 212 receives a request 204, sent by a client 202, to delete an item of database data, such as an item in a collection of data maintained by the data store 212. The data store 212 maintains the collection of data in one or more log-based storage structures 214, such as a log-structured merge ("LSM") tree 214. An LSM tree is a data structure for storing data items, and comprises substructures organized by layer, such as a first layer that is stored in-memory, and a second layer that is stored on a long-term storage device, such as a mechanical or solid-state disk drive. The substructures may each contain a portion of a collection of data items. Data items stored in the substructures is periodically migrated from the first layer to the second layer, or more generally from higher layers kept in faster memory to lower levels kept in slower but more plentiful storage. This process is described in more detail in relation to FIG. 3. Typically, log-based storage structures, including LSM trees, are well-suited for use in cases where data items are added frequently. For example, the substructures may be designed, in at least one embodiment, to optimize appending new data items.

Upon receiving the delete request 204, the data store 212 stores an entry in the log-based storage structure 214 to represent the deleted item's tombstone. The entry may contain information indicating its status as a tombstone, as well as additional information that correlates the tombstone to the deleted item it represents. The entry may also contain additional metadata, such as a TTL value for the tombstone or data that client 202 requests to be stored with the tombstone.

The client 202 may obtain tombstone metadata by sending a tombstone data request 206 to the data store 212. In at least one embodiment, the tombstone data request 206 includes a key or other information that identifies the item to which the requested tombstone corresponds. The data store 212 responds to the request 206 by sending tombstone data 208 to the client 202. In at least one embodiment, the tombstone data 208 includes a timestamp or serial number indicating when the corresponding item was deleted. In some cases, tombstone data may be requested for an item that has not yet been deleted, in which case data store 212 can respond by sending a message so indicating to the client 202. The facility to access tombstone data may be used, in some cases, to determine whether or not an item has been deleted.

In at least one embodiment, the client 202 sends a tombstone update request 210 to the data store 212. The tombstone update request 210 can include information that may be applied to an existing tombstone record in order to modify it. In at least one embodiment, the modification of tombstone metadata is requested. For example, the client 202 can send a request indicating that the timestamp of a tombstone should be modified. This might occur, for example, if client 202 deletes an item but subsequently learns that a replication partner deleted the same item at an earlier time. The facility to allow client 202 to access or update tombstone metadata may therefore be used to improve data consistency in data replication scenarios, and other applications.

Figure 3:
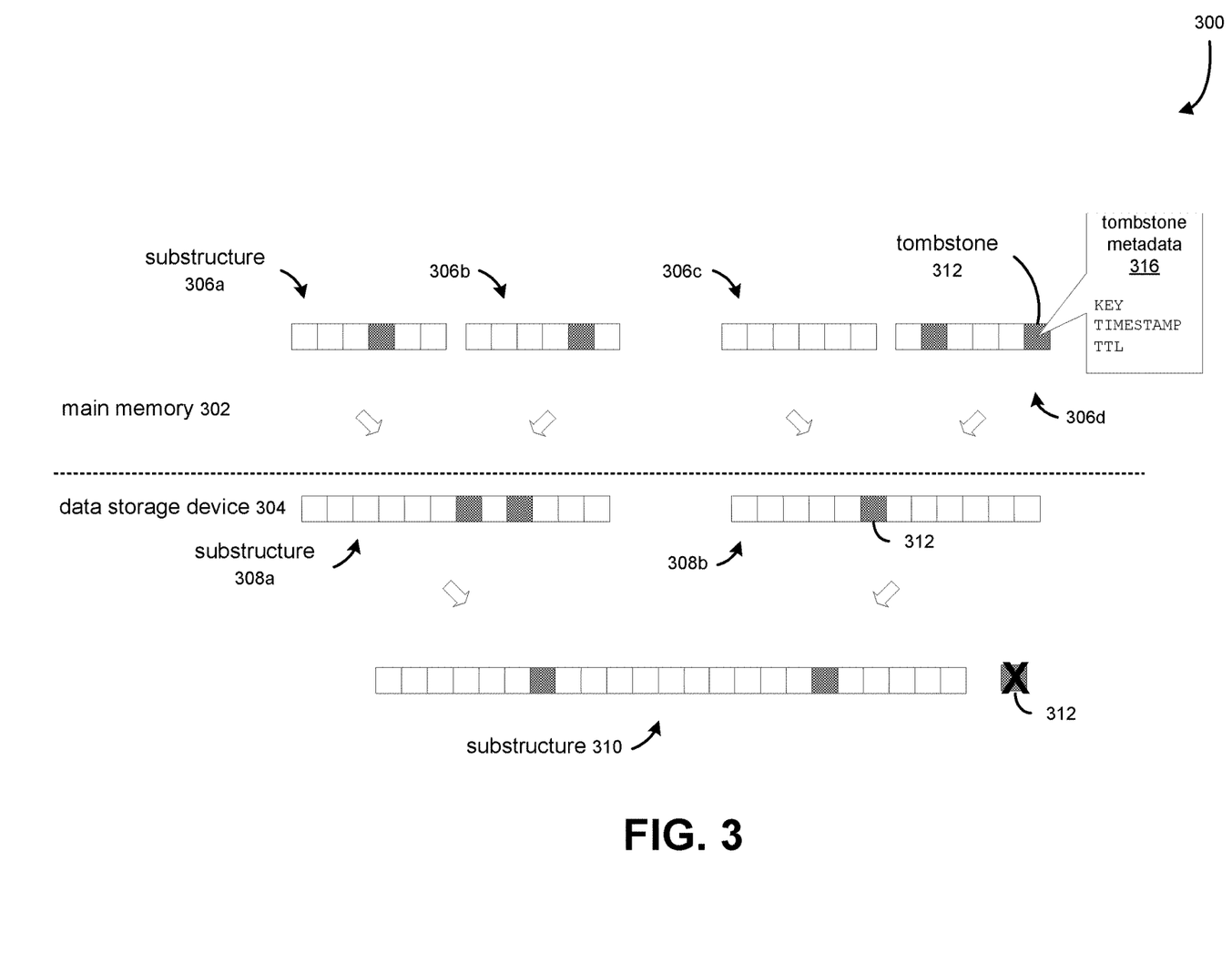
FIG. 3 illustrates an example of maintaining tombstone data in a log-based storage structure, in accordance with at least one embodiment.

FIG. 3 illustrates an example of maintaining tombstone data in a log-based storage structure, in accordance with at least one embodiment. In the example log-based storage structure 300 of FIG. 3, the log-based storage structure is a log-structured merge tree comprising a layer of substructures 306a-d stored in main memory 302, and additional layers of substructures 308a-b, 310 stored on a data storage device 304.

In at least one embodiment, a substructure, such as any of the depicted substructures 306a-d, 308a-b, 310, comprises a list of entries, each of which describes an addition or modification of a data item. For example, an entry may be added to the list of entries in a substructure to represent a newly added data item. A subsequent entry may be added, to the same or different substructure, to represent a change to that data item. Yet another entry may be added when the item is deleted. This entry may be referred to as a tombstone entry. In at least one embodiment, a tombstone 312 is added to a substructure 306d to indicate that a particular item has been logically deleted from a collection of items. Other entries, pertaining to the same item, may remain within substructures 306a-d in the same level, or in other levels.

The tombstone 312, in at least one embodiment, comprises tombstone metadata 316. This may include information such as a key of the item to which the tombstone corresponds, a timestamp or serial number indicative of when the tombstone was deleted, and a time-to-live value. The time-to-live value indicates when it will become permissible to physically or logically delete the tombstone. In at least one embodiment, a tombstone is removed during compaction.

Entries stored in a higher-level layer of substructures are periodically compacted into a lower-level of substructures. For example, in FIG. 3 the entries in a higher-level layer of substructures 306a-d are merged into, or formed into, a lower-level layer of substructures 308a-b. Similarly, this level of substructures 308a-b may be merged into, or formed into, a further layer comprising substructure 310.

A lower-level substructure 308a is formed, in at least one embodiment, by merging entries in higher-level substructures 306a-b. Likewise, substructures 306c-d may be merged to form a lower-level substructure 308b. In at least one embodiment, entries corresponding to the same item are merged into few entries during this process, and entries corresponding to deleted items are excluded. For example, entries in higher-level substructures 306a-d that correspond to a deleted item may be excluded, during the merge process, from the lower-level substructures 308a-b. In another embodiment, entries corresponding to a deleted item are not excluded from lower-level substructures, and are not otherwise physically deleted, until the corresponding tombstone entry is also excluded or otherwise physically deleted.

As depicted in FIG. 3, a tombstone 312 may be added to a substructure 306d and then subsequently merged into a lower-level substructure 308b. The tombstone 312 is merged into the lower-level substructure 308b based at least in part on the non-expiry of its TTL period. However, when a subsequent compaction operation merges the substructures 308a,b into a substructure 310, the tombstone 312 may be excluded if its TTL period has expired. Note that the substructure 308b, in which the tombstone 312 was located, may itself be deleted, or can be reclaimed to store new items. As such, the tombstone 312 can be treated as logically deleted after the expiry of its TTL period and a subsequent compaction operation. Moreover, the tombstone 312 may also be physically deleted, after the expiry of its TTL period, by the compaction.

Figure 4:
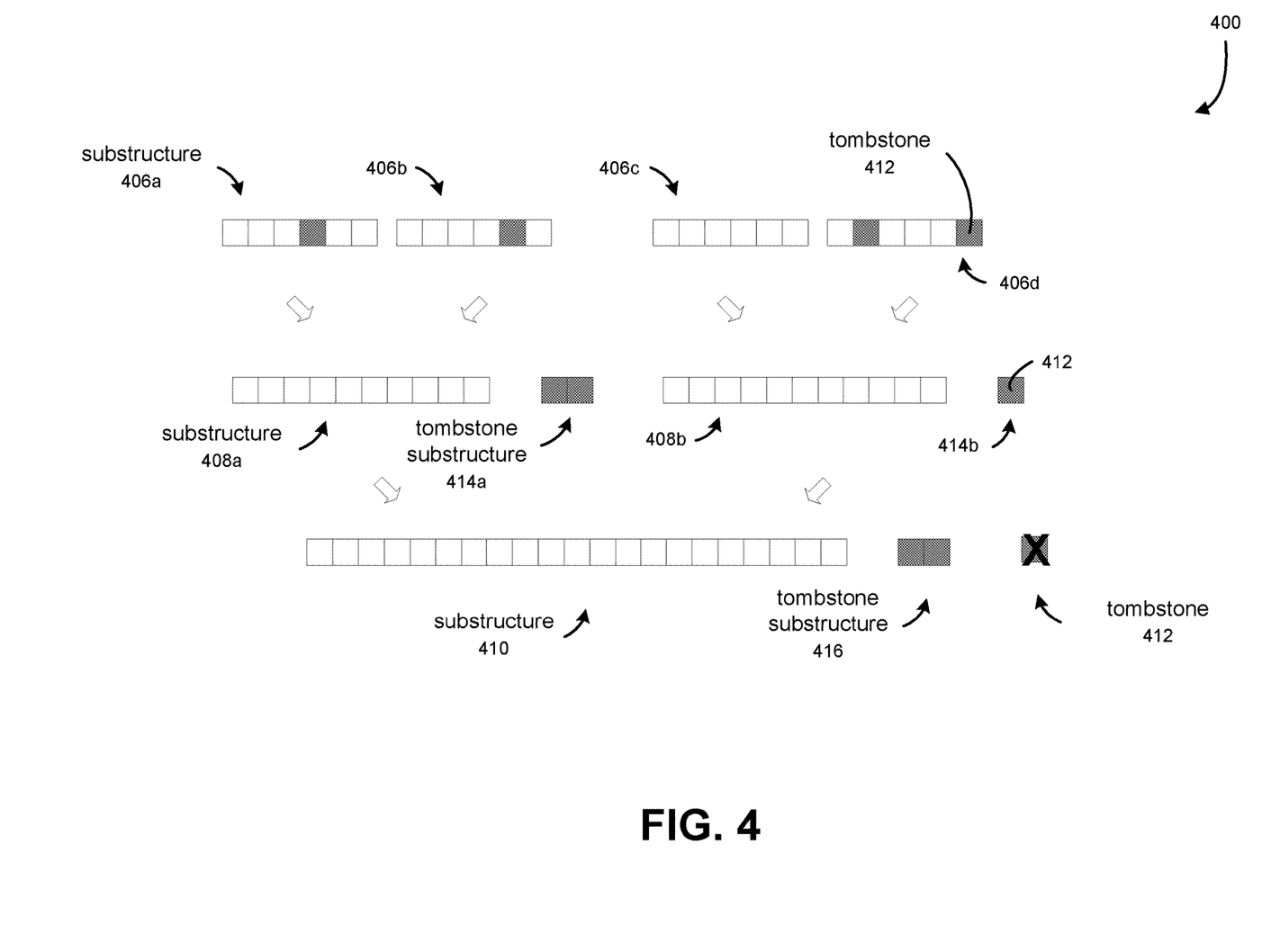
FIG. 4 illustrates a further example of maintaining tombstone data in a log-based storage structure, in accordance with at least one embodiment.

FIG. 4 illustrates a further example of maintaining tombstone data in a log-based storage structure, in accordance with at least one embodiment. In the example log-based storage structure 400 of FIG. 4, the log-based storage structure is a log-structured merge tree comprising a layer of substructures 406a-d stored in main memory, and additional layers of substructures 408a-b, 410 stored on a data storage device. In addition, the log-based storage structure 400 comprises tombstone substructures 414a-b, 416. These are, in at least one embodiment, data structures similar to substructures 406a-d, 408a-b, 410 but primarily or exclusively comprising tombstone entries.

In at least one embodiment, a tombstone entry 412 is added to a log-based storage structure 400 to indicate that an item corresponding to the tombstone 412 has been logically deleted. The tombstone 412 is stored with information indicating when its TTL period will expire. During compaction, substructures 406a,b are merged into a lower-level substructure 408a. Tombstone entries from higher-level substructures 406a,b are merged into a separate lower-level substructure 414a that primarily or exclusively comprises tombstone entries. Likewise, the higher-level substructures 408c,d (comprising the aforementioned tombstone 412) are merged into a lower-level substructure 408b and tombstone substructure 414b. The tombstone structure 414b, in this example, excludes any tombstones in the higher-level substructures 408c,d that have expired, but includes the tombstone entry 412 if it has not expired at the time of compaction.

During a subsequent round of compaction, in at least one embodiment, the substructures 408a,b and tombstone substructures 414a,b are merged, to form a substructure 410 and a tombstone substructure 416. The tombstone substructure 416 excludes the tombstone entry 412 if its TTL period has expired.

Use of a separate tombstone structure may convey various advantages, such as improving search efficiency when testing for the existence of a tombstone or when retrieving tombstone data. For example, referring back to FIG. 2, a data store 212 may receive a tombstone data request 206. The request 206 may include a key of an item whose tombstone data is to be retrieved. To find the data, the tombstone substructures 414a-b, 416 may be searched directly. The tombstone substructures 414a-b, 416 may be smaller in size than the general-purpose substructures 406a-d, 408a-b, 410, or optimized differently than the non-tombstone substructures.

Figure 5:
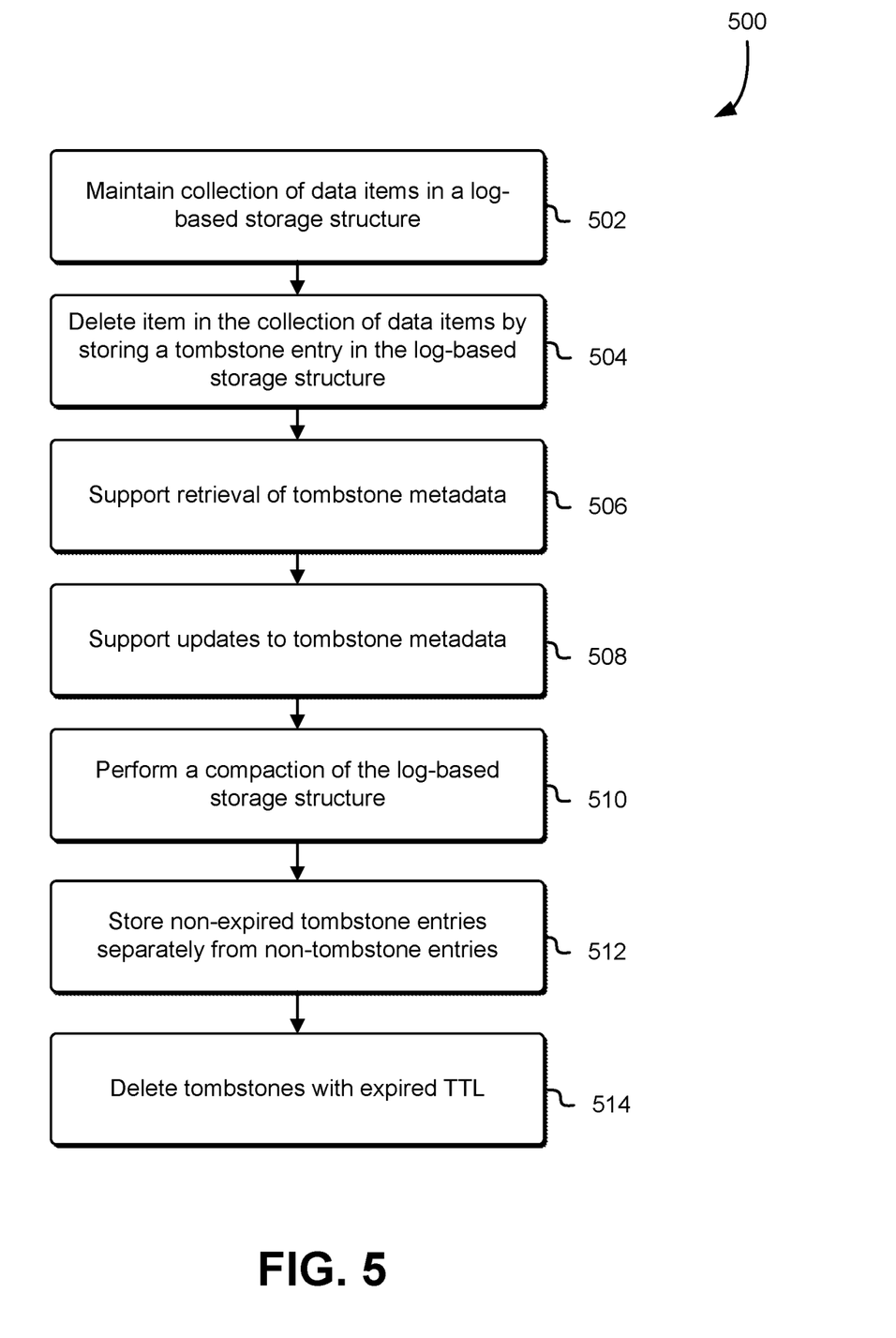
FIG. 5 illustrates an example process of providing client access to tombstone data in a database, in accordance with at least one embodiment.

FIG. 5 illustrates an example process of providing client access to tombstone data in a database, in accordance with at least one embodiment. Although the example 500 of FIG. 5 is depicted as a sequence of steps or operations, the depicted sequence should not be construed as limiting the scope of the present disclosure to only those embodiments conforming to the depicted order. For example, unless otherwise indicated or clear from context (e.g., when the output of one step is used as input into another), at least some of the depicted steps or operations may be reordered or performed in parallel.

In at least one embodiment, the steps or operations depicted in FIG. 5 are performed by a component of a distributed database system. For example, in at least one embodiment, the steps or operations depicted in FIG. 5 are performed by a data store such as any one of the data stores 112, 114 depicted in FIG. 1, or the data store 212 depicted in FIG. 2. In at least one embodiment, the steps or operations depicted in FIG. 5 are performed by a data store using a log-based storage structure similar to those depicted in FIGS. 3 and 4.

At 502, the data store maintains a collection of data items in a log-based storage structure. Maintaining the collection of data items comprises operations including adding a data item, modifying a data item, and deleting a data item. These operations are performed, in at least one embodiment, by adding one or more entries to the log-based storage structure. The entries may be added initially to a higher-level substructure, and are subsequently merged with other substructures, during a process that is sometimes referred to as compaction.

At 504, the data store deletes an item from the collection of data items by storing a tombstone entry in the log-based storage structure. For example, referring again to FIG. 3, the tombstone entry may be appended to one of the higher-level substructures 306a-d of the log-based storage structure 300. The tombstone entry includes metadata, such as a key of the item, which indicates the tombstone's correspondence with the item. The presence of a valid (e.g., unexpired) tombstone entry indicates that the corresponding item has been logically deleted from the collection of items.

At 506, the data store supports retrieval of tombstone metadata. For example, in at least one embodiment, tombstone metadata is accessed by a client in accordance with the example of FIG. 2. In at least one embodiment, a data store receives a request indicative of accessing metadata associated with a tombstone of a data item. In response to the request, the data store locates entries in the log-based storage structure that are tombstone entries and that pertain to the indicated data item. An entry may be marked as a tombstone with a flag or other information indicating that it is a tombstone entry. Note that, in some cases and embodiments, a given item may have more than one tombstone entry in the log-based storage structure. For example, in at least one embodiment, a first tombstone entry is added when an item is initially deleted, and a second tombstone entry is added when the tombstone's metadata is updated.

The data store's capability of providing access to tombstone metadata can be used to verify the deletion status of an item. For example, in at least one embodiment, a data store receives a request to verify the deletion status of a data item. In response to the request, the data store locates a tombstone entry in the log-based storage structure. The presence of a tombstone, in at least one embodiment, indicates that the item has been deleted. In some cases and embodiments, tombstone entries may include a flag or other information that indicates whether or not the tombstone remains valid. This might be done, for example, if the data store supports reversal of a deletion operation.

At 508, the data store supports updates to tombstone metadata. In at least one embodiment, a data store provides a capability to add to or modify metadata associated with a tombstone. For example, in at least one embodiment, a data store may permit the TTL period of a tombstone to be extended.

In another example, a data store may permit the tombstone's timestamp or serial number to be modified to indicate a different time of deletion. This may be useful in cases where the data store is part of a replication group. For example, as described in relation to FIG. 1, a client 104 of a data store 114 may delete an item from a collection of data after a replication partner, e.g., a second data store 112, has deleted the same item, but before that deletion has been replicated by permitting update to the tombstone metadata.

At 510, the data store performs a compaction of the log based storage structure. The compaction comprises combining, or merging, higher-level substructures into lower-level substructures. For example, substructures of the log-based storage structure may be combined in accordance with the examples of FIG. 3 or 4. In at least one embodiment, multiple entries pertaining to a given item are merged into single entries. In at least one embodiment, entries associated with a tombstone entry are excluded from the lower-level substructure, and may be deleted from the higher-level substructure. In some cases and embodiments, the higher-level substructure is in a relatively fast main memory, and the lower-level substructure is stored on a long-term storage device with relatively high capacity, such as a mechanical or solid-state disk drive.

Tombstone entries in higher-level substructure may merged into lower-level substructures during compaction. In at least one embodiment, a deleted item's entries, other than its tombstone entries, are excluded from the lower-level substructure and may be deleted. A tombstone entry, on the other hand, is merged into the lower-level substructure if its TTL period has not expired. Accordingly, in at least one embodiment, a data store compacts a log-based storage structure by combining entries in a first substructure with entries in a second substructure, to form a third substructure. A tombstone entry in the first or second substructure is retained in the third substructure if the compacting is performed prior to expiration of the tombstone entry's TTL period.

The data store, as depicted by step or operation 512, stores non-expired tombstone entries separately from non-tombstone entries. As illustrated in FIG. 4, tombstone entries may be stored in substructures that are separate from other entries. In at least one embodiment, a data store identifies tombstone entries in a substructure during compaction, and stores the tombstone entries in a lower-level substructure separate from other entries in the same level. In at least one embodiment, the substructure containing the tombstone entries is kept in a file separate from files containing other entry types. In at least one embodiment, tombstone entries are stored in separate substructures initially, i.e. when first placed into a higher-level substructure.

At 514, the data store deletes tombstone entries whose TTL period has expired. In at least one embodiment, this is done during compaction by not merging expired tombstones into a lower-level substructure. In at least one embodiment, expired tombstones are marked as deleted and can no longer be accessed. The memory space occupied by the tombstones can then be reclaimed as needed.

Figure 6:
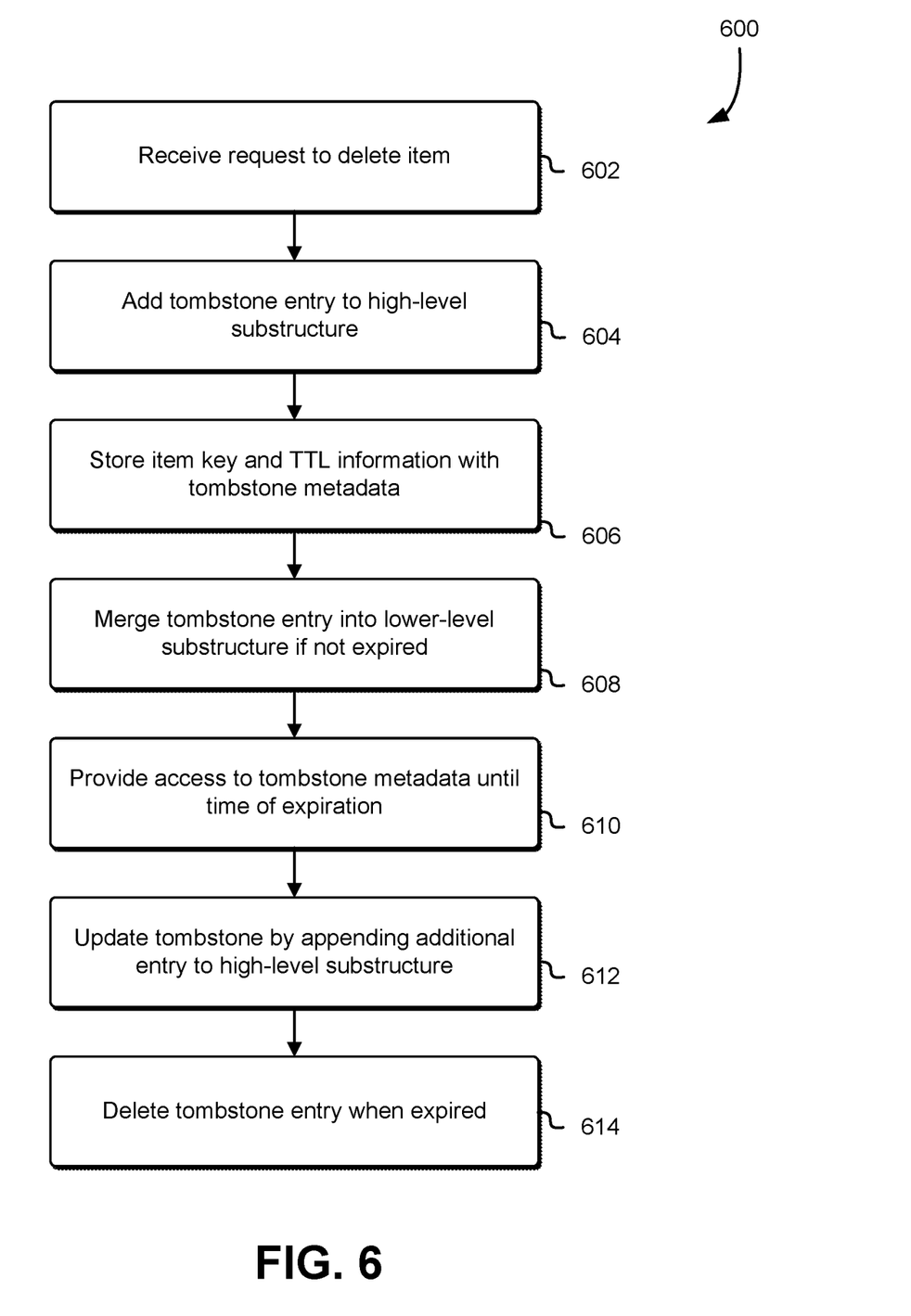
FIG. 6 illustrates an example of maintaining tombstone data in a log-based storage structure, in accordance with at least one embodiment.

FIG. 6 illustrates an example of maintaining tombstone data in a log-based storage structure, in accordance with at least one embodiment. Although the example 600 of FIG. 6 is depicted as a sequence of steps or operations, the depicted sequence should not be construed as limiting the scope of the present disclosure to only those embodiments conforming to the depicted order. For example, unless otherwise indicated or clear from context (e.g., when the output of one step is used as input into another), at least some of the depicted steps or operations may be reordered or performed in parallel.

In at least one embodiment, the steps or operations depicted in FIG. 6 are performed by a component of a distributed database system. For example, in at least one embodiment, the steps or operations depicted in FIG. 6 are performed by a data store such as any one of the data stores 112, 114 depicted in FIG. 1, or the data store 212 depicted in FIG. 2. In at least one embodiment, the steps or operations are performed by a data store using a log-based storage structure similar to those depicted in FIGS. 3 and 4.

At 602, a request to delete a data item is received. In at least one embodiment, the request comprises a key of the item, or information specifying criteria for locating the item. For example, the request may be provided as a query language command, such as a SQL command, that specifies criteria for identifying an item, or items, to be deleted.

At 604, a tombstone entry is added, in response to the request, to a high-level substructure of a log-based storage structure. The tombstone entry comprises a key or other information identifying the item to which the tombstone entry corresponds. A tombstone entry, in at least one embodiment, is structurally identical or at structurally similar to other entry types, but includes information identifying it as a tombstone. For example, entries in a log-based storage structure may comprise a flag to indicate whether or not the entry functions as a tombstone.

At 606, an item key and TTL information are stored with the tombstone's metadata. As just noted, a tombstone may be associated with a key that identifies the item to which the tombstone corresponds. In at least one embodiment, this is a primary key of the item. TTL information may include a timestamp, information indicating the TTL period, and so forth. A timestamp may also be stored with the tombstone or, a serial number. The timestamp or serial number identifies the relative position, in a sequence of operations, of the operation which resulted in the deletion of the corresponding item. The timestamp may also be used to determine whether or not a tombstone's TTL period has expired. In some embodiments, the TTL period of an item can be configured independently. In some embodiments, a system-wide setting is used. These values may be configured, in some embodiments, by a client of a data store. The TTL period of a tombstone, in some embodiments, may be extended.

At 608, a tombstone is merged into a lower-level substructure, if not expired. As described herein, for example with respect to FIGS. 3 and 4, a tombstone may comprise multiple levels of substructures. The substructures in a particular level may be merged together to generate a lower-level substructure. Tombstone entries in a higher level substructure are preserved during the merge process if they have not yet expired. Here, expiration of a tombstone refers to its TTL period elapsing. If a tombstone's TTL period has elapsed, the tombstone is not merged and it may be deleted. However, prior to the tombstone's expiration, it may be preserved in lower-level substructures if and when higher-level substructures are merged.

At 610, access is provided to the tombstone metadata, up to the time of that tombstone's expiration. In at least one embodiment, access is provided up to the time of the tombstone's deletion, which may occur sometime after expiration, e.g. during the next compaction. A client may request access by sending an appropriate command to a data store.

At 612, the tombstone's metadata is updated by appending an additional tombstone entry, pertaining to the same item, to the high-level substructure. This may be done to make the collection of data more consistent with other replication partners. For example, the time of deletion can be updated to match an earlier time of deletion. Various client applications may also employ logic to change data associated with a deletion operation. Note that, in at least one embodiment, such information may be preserved in a persistent log even after a tombstone is deleted from the log-based storage structures employed by the system's storage nodes.

At 614, the tombstone entry is deleted after it expires. This may occur during compaction, when items in higher-level substructures are merged into lower-level substructures, and expired tombstones are excluded.

Figure 7:
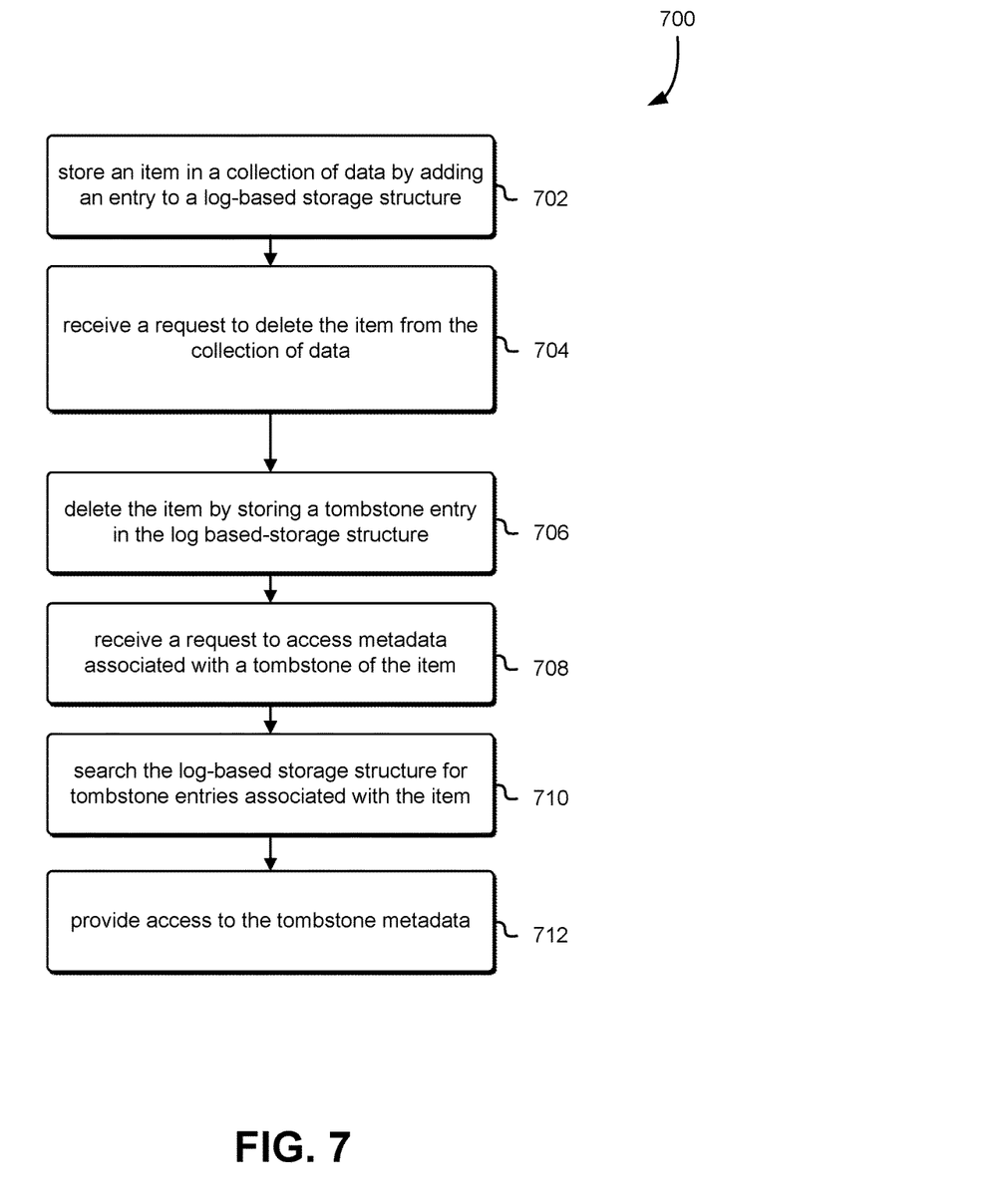
FIG. 7 illustrates an example process for operating a distributed database management system, in accordance with at least one embodiment.

FIG. 7 illustrates an example process for operating a distributed database management system, in accordance with at least one embodiment. Although the example 700 of FIG. 7 is depicted as a sequence of steps or operations, the depicted sequence should not be construed as limiting the scope of the present disclosure to only those embodiments conforming to the depicted order. For example, unless otherwise indicated or clear from context (e.g., when the output of one step is used as input into another), at least some of the depicted steps or operations may be reordered or performed in parallel.

In at least one embodiment, the steps or operations depicted in FIG. 7 are performed by a component of a distributed database system. For example, in at least one embodiment, the steps or operations depicted in FIG. 6 are performed by a data store such as any one of the data stores 112, 114 depicted in FIG. 1, or the data store 212 depicted in FIG. 2. In at least one embodiment, the steps or operations are performed by a data store using a log-based storage structure similar to those depicted in FIGS. 3 and 4.

At 702, a client requests that an item of data be stored in a collection of data. The request is sent to a data store, which stores the item by adding an entry to a log-based storage structure. The item may be a unit of data which the database is capable of storing, such as a row of data or a collection of related values. The request to store the item may be provided as a command, such as a SQL INSERT command, or a NoSQL PUT command.

At 704, a client requests that the previously added item be deleted from the collection of data. The data store receives the request to delete the item. This request may also be a command, such as a SQL or NoSQL delete command.

At 706, the data store responds to the request by storing a tombstone entry in the log-based storage structure. For example, the data store may append an entry to one of the top-level substructures of a log-based storage structure. The entry may be marked as a tombstone and stored with a primary key of the corresponding item, and a timestamp or serial number. The entry may comprise additional metadata, such as a TTL value.

At 708, the client requests access to metadata that is associated with the deleted item. The data store receives the request to access the metadata. The request may also take the form of a SQL or NoSQL command. For example, tombstone metadata may be treated as a column of a table, or as a property, and requested using a SQL or NoSQL command.

At 710, the data store searches the log-based storage structure for tombstones that are associated with the deleted item. The search may comprising scanning substructures of the log-based storage structure to find entries that are both marked as tombstones and that contain an identifier corresponding to the deleted item. In at least one embodiment, modifications to the tombstone data for the item are done by adding additional tombstone entries. The log-based storage structure may therefore contain more than one entry for any given item.

At 712, the data store provides access to the tombstone metadata. Embodiments may provide both read and write access. For read access, the data store may return a copy of the metadata to the client. For write access, the data store may append an additional tombstone, associated with the applicable item, to the log-based storage structure.

Figure 8:
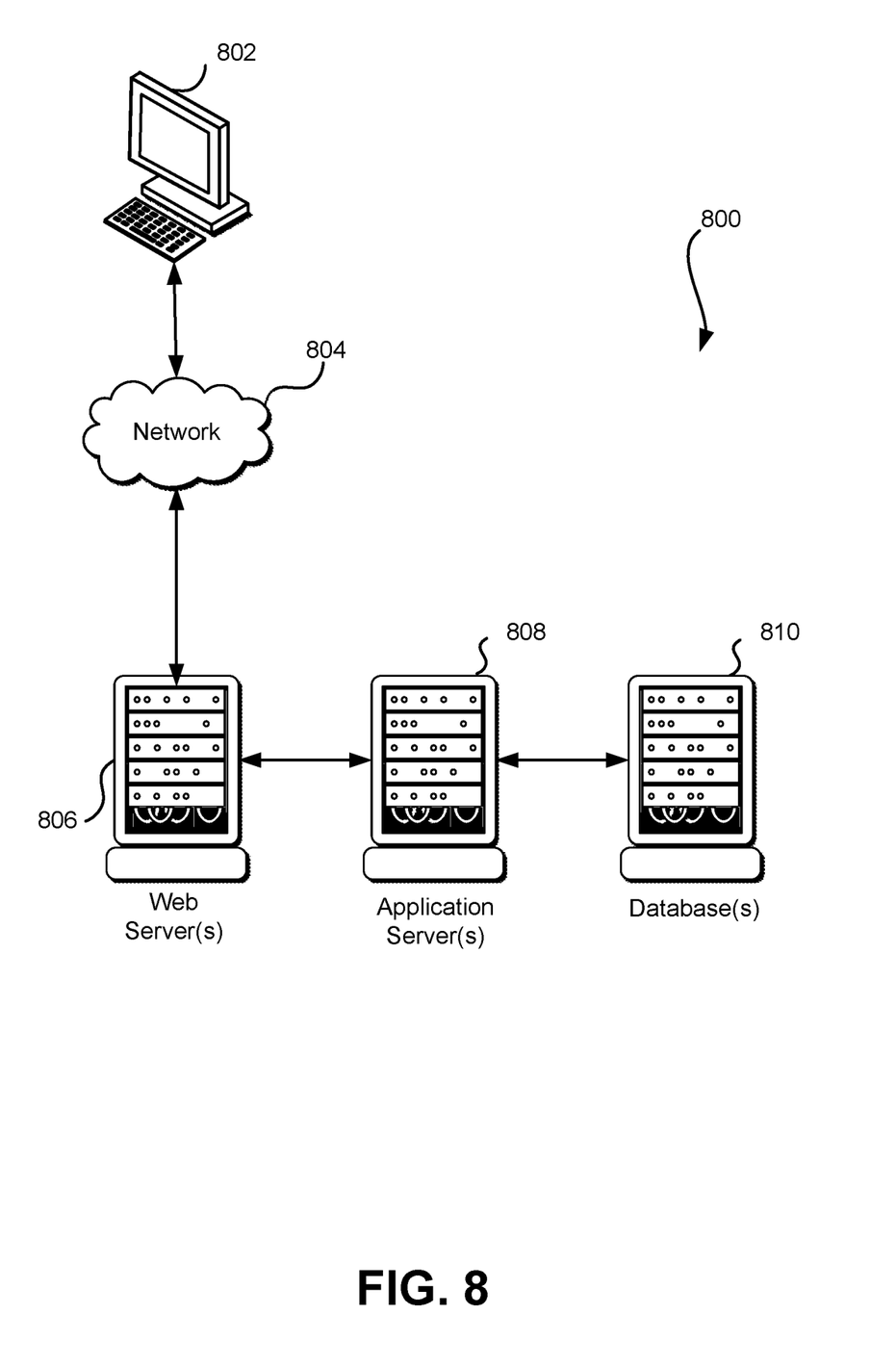
FIG. 8 illustrates a system in which various embodiments can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and one or more databases 810, and it should be understood that there can be several application servers, layers or other elements, processes or components, which may be chained or otherwise configured, which can interact to perform tasks such as obtaining data from an appropriate database. The application server(s) 808 and database(s) may be operative on one or more servers. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The database(s) 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data and user information, which are used to serve content for the production side. The data store also is shown to include a mechanism for storing log data, which is used, in an embodiment, for reporting, computing resource management, analysis or other such purposes. In an embodiment, other aspects such as page image information and access rights information (e.g., access control policies or other encodings of permissions) are stored in the database using any of the above listed mechanisms as appropriate or in addition to mechanisms in a data store of the database 810.

The database(s) 810, in an embodiment, is operable, through logic associated therewith, to receive instructions from the application server 808 and obtain, update or otherwise process data in response thereto, and the application server 808 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

The database(s) 810, in an embodiment, comprise one or more journaled database management systems, such as the journaled database management system depicted in FIG. 1. A journaled database management system may, in at least some embodiments, be a distributed system operative on a plurality of servers. In other embodiments, a journaled database management system is operative on one server.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
   at least one processor; and
   a memory comprising instructions that, in response to execution by the at least one processor, cause the system to at least:
   store an item in a collection of data by at least adding a first entry to a log-based storage structure comprising multiple levels;
   delete the item from the collection of data by at least storing a second entry in a first level of the log-based storage structure, wherein the second entry comprises information indicating that the second entry is a tombstone of the item, and comprises metadata associated with the tombstone;
   retrieve from the log-based storage structure, in response to a request to access information stored with the tombstone of the item, the metadata stored with the second entry;
   send the metadata in response to the request;
   add a third entry to the log-based storage structure in response to a request to update metadata associated with the tombstone, wherein the third entry comprises information indicating that the third entry is the tombstone of the item, and comprises updated metadata associated with the tombstone; and
   delete the second entry after expiration of a time-to-live ("TTL") period.

2. The system of claim 1, the memory comprising further instructions that, in response to execution by the at least one processor, cause the system to at least:
   compact the log-based storage structure by at least excluding the second entry from a merged substructure of the log-based storage structure, subsequent to expiration of the TTL period.

3. The system of claim 1, where the log-based storage structure comprises a first level of substructures stored in a main memory of a computing device, and a second level of substructures stored on a storage device, and wherein one or more substructures of the first level are merged into one or more substructures of the second level.

4. The system of claim 1, the memory comprising further instructions that, in response to execution by the at least one processor, cause the system to at least:
   respond to a request to update metadata associated with the tombstone by at least adding, to the log-based storage structure, an additional entry comprising updated metadata associated with the tombstone.

5. The system of claim 1, the memory comprising further instructions that, in response to execution by the at least one processor, cause the system to at least:
   store the second entry in a substructure of the log-based storage structure, the substructure comprising tombstone entries and excluding non-tombstone entries.

6. A computer-implemented method, comprising:
   storing an item in a database by at least adding a first entry to a log-based storage structure comprising at least one substructure;
   responding to a request to delete the item from the database by at least storing a second entry in the log-based storage structure, the second entry comprising information indicating that the second entry is a tombstone of the first entry;
   storing, in the second entry, metadata associated with the tombstone of the first entry;
   retrieving, in response to a request by a client to access metadata of a tombstone associated with the deleted item, the metadata stored in the second entry; providing the metadata to the client; and
   adding a third entry to the log-based storage structure in response to a request to update metadata associated with the tombstone, wherein the third entry comprises information indicating that the third entry is the tombstone of the first entry, and comprises updated metadata associated with the tombstone.

7. The method of claim 6, further comprising:
   deleting the second entry from the log-based storage structure subsequent to expiration of a time-to-live ("TTL") period.

8. The method of claim 7, wherein the TTL period is based, at least in part, on an estimate of a maximum length of time for a deletion of the item to be replicated between nodes of the database.

9. The method of claim 6, further comprising: responding to the
   request to access tombstone information associated with the item by at least locating, in the log-based storage structure, one or more entries that comprise a key identifying the item and information indicative of being a tombstone.

10. The method of claim 6, further comprising:
    adding an additional entry to the log-based storage structure, the additional entry comprising information indicative of a change to the metadata associated with the tombstone of the item.

11. The method of claim 6, further comprising:
    merging a first plurality of entries in a first substructure of the log-based storage structure with a second plurality of entries in a second substructure, to generate a merged substructure, wherein expired tombstone entries are excluded from the merged substructure.

12. The method of claim 6, further comprising:
    storing tombstone entries in a substructure which excludes non-tombstone entries.

13. The method of claim 6, wherein the second entry comprises at least one of a key identifying the item, information indicative of a time-to-live ("TTL") period of the tombstone, or information provided by a client.

14. A non-transitory computer-readable storage medium storing thereon executable instructions that, as a result of being executed by one or more processors of a computer system, cause the computer system to at least:
    receive a request to delete an item from a database, wherein the item is associated with a first entry in a log-based storage structure comprising multiple levels;
    store, in response to the request, a second entry in the log-based storage structure, the second entry comprising information indicating that the second entry is a tombstone of the item and comprising metadata associated with the tombstone;
    retrieve, in response to a request by a client to access metadata associated with a tombstone of the item, the metadata stored in the second entry;
    send the metadata to the client; and
    add a third entry to the log-based storage structure in response to a request to update metadata associated with the tombstone, wherein the third entry comprises information indicating that the third entry is the tombstone of the item, and comprises updated metadata associated with the tombstone.

15. The non-transitory computer-readable storage medium of claim 14, wherein the metadata comprises a value indicative of a time-to-live ("TTL") period of the tombstone.

16. The non-transitory computer-readable storage medium of claim 14, the non-transitory computer-readable storage medium storing thereon further executable instructions that, as a result of being executed by the one or more processors, cause the computer system to at least:
receive a request indicative of accessing the metadata associated with the tombstone of the item;
locate, in response to the request, one or more entries of the log-based storage structure, the one or more entries comprising the second entry; and
return metadata associated with the second entry, based at least in part on the second entry being a most recent entry of the one or more entries.

17. The non-transitory computer-readable storage medium of claim 14, the non-transitory computer-readable storage medium storing thereon further executable instructions that, as a result of being executed by the one or more processors, cause the computer system to at least:
compact the log-based storage structure by at least merging a first plurality of entries in a first substructure with a second plurality of entries in a second substructure, to generate a merged substructure, wherein expired tombstone entries are excluded from the merged substructure.

18. The non-transitory computer-readable storage medium of claim 14, the non-transitory computer-readable storage medium storing thereon further executable instructions that, as a result of being executed by the one or more processors, cause the computer system to at least:
compact the log-based storage structure by at least storing tombstone entries in one or more files separate from non-tombstone entries.

19. The non-transitory computer-readable storage medium of claim 14, the non-transitory computer-readable storage medium storing thereon further executable instructions that, as a result of being executed by the one or more processors, cause the computer system to at least:
receive, from a client device, a request to verify deletion status of the item; and verify the deletion status by at least locating the second entry in the log-based storage structure.

20. The non-transitory computer-readable storage medium of claim 14, wherein a time-to-live ("TTL") period of the second entry is at least one of extendable or configurable by a client device.

* * * * *